United States Patent [19]
Shell

[11] 3,779,499
[45] Dec. 18, 1973

[54] SUPPORT ASSEMBLY

[76] Inventor: Irving W. Shell, 442 W. Wellington, Chicago, Ill. 60657

[22] Filed: Oct. 30, 1972

[21] Appl. No.: 301,867

Related U.S. Application Data

[63] Continuation of Ser. No. 254,289, May 17, 1972.

[52] U.S. Cl. ............. 248/245, 248/224, 287/189.36
[51] Int. Cl. ............................................. A47b 47/00
[58] Field of Search .................... 248/224, 243, 244, 248/245

[56] References Cited
UNITED STATES PATENTS

| | | | |
|---|---|---|---|
| 2,682,322 | 6/1954 | Bloedow | 287/189.36 F |
| 2,928,512 | 3/1960 | Slater | 248/243 X |
| 3,029,056 | 4/1962 | Breglia | 248/243 |
| 3,143,981 | 8/1964 | Tassell | 248/243 X |

Primary Examiner—William H. Schultz
Attorney—Richard R. Mybeck

[57] ABSTRACT

A support assembly comprising in combination a support standard having a longitudinal channel defined therein having opposing faces on the sides thereof, each of the faces of the channel having longitudinally extending grooves defined thereupon on either side of a pocket portion disposed therewithin; an intermediate member or connector means disposed in and between said pocket portion and connectable with an article to be supported thereby, said member having an opening defined therethrough extending axially of the article to be supported thereby; and a bolt extendible through said opening in said intermediate member into locking engagement with said grooves in said channel whereupon said standard, said intermediate member and said bolt are integrally joined to support said article when connected thereto. The locking engagement is obtained by the coaction of the grooves on the faces of the channel with the threads on the bolt.

5 Claims, 6 Drawing Figures

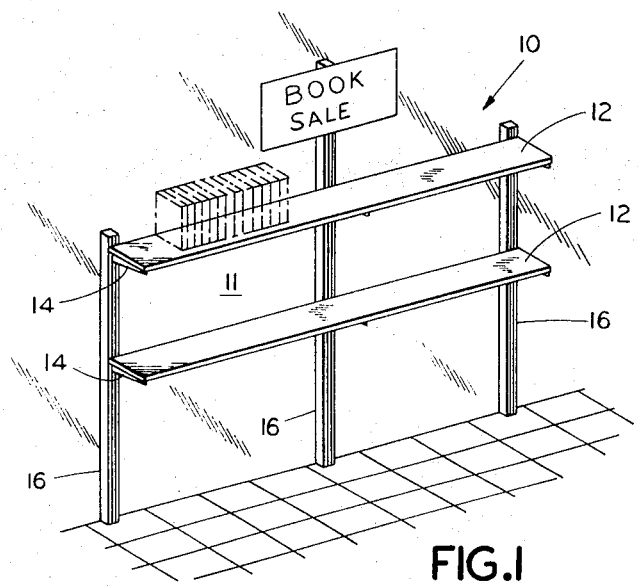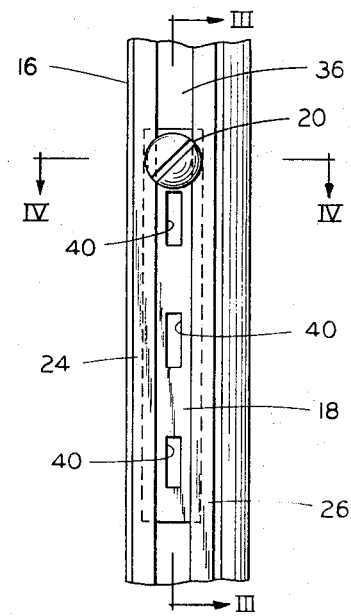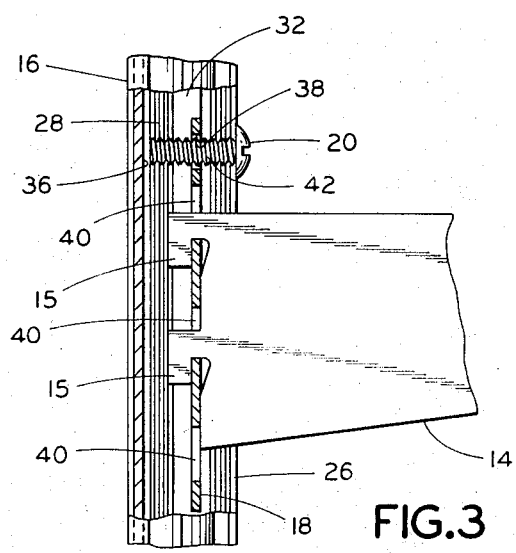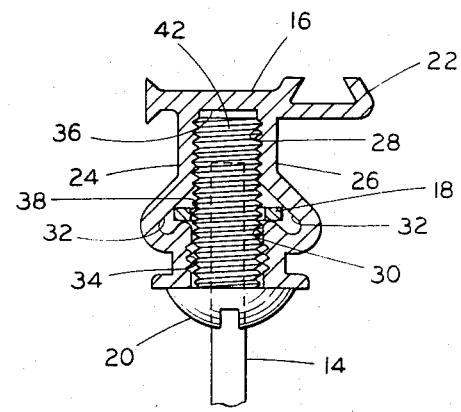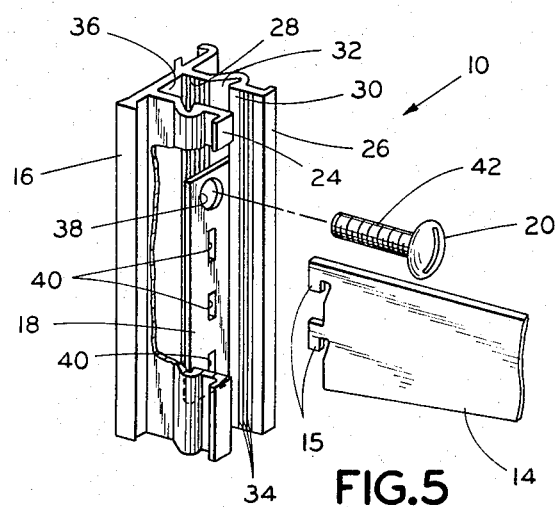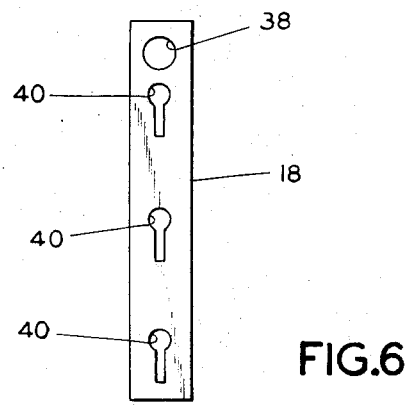

SUPPORT ASSEMBLY

This application is in part a continuation of my co-pending United States patent application Ser. No. 254,289, filed May 17, 1972 for Coupling Assembly.

DESCRIPTION OF INVENTION

This invention relates generally to a support assembly for use in the construction of shelving and partitions and more particularly to a novel system of attaching members such as shelf supports, partitions and the like to specially designed free standing or wall mounted upright standards whereupon desired assemblies are quickly and easily created with a minimum of labor and none of the tedium of alignment inherent in many of the prior art structures.

Means for connecting a variety of members to each other to create an assembly of predetermined shape and size such as book shelves, room partitions and the like, are broadly old in the art but as will appear, none have obtained all of the many advantages available from the assembly of the present invention which further substantially eliminates all of the problems and annoyances which have inherently accompanied the prior art devices.

Representative prior art devices are described in U.S. Pats. Nos. 2,674,431, Apr. 6, 1954, Attwood; 2,696,139, Dec. 7, 1954, Attwood; Re. 24,133, Mar. 20, 1966 Bloedow; 3,139,960, July 7, 1964, Hammitt et al.; and 3,564,666, Feb. 23, 1971, Dold.

A consideration of each of the prior art disclosures will clearly reveal that while certain needs were indeed fulfilled by each of the structures they define, major problems remained unsatisfied. It is to the solution of those problems that the present invention is directed.

Accordingly, it is a principal object of the present invention to provide a new and improved support assembly for connecting members such as shelf brackets, partitions and the like with specially designed free standing or wall mounted uprights in a manner which permits desired assemblies to be quickly and easily created with a minimum of labor and none of the tedium of alignment heretofore inherent in such structures.

Another object of the present invention is to provide a support assembly for shelf brackets, partitions and the like which eliminates the need to align the slots in a plurality of uprights while obtaining a structure which is quickly, easily and accurately leveled.

Still a further object of the present invention is to provide a new and improved support assembly especially suited for mounting level shelving to vertically disposed standards irrespective of the condition of level of the floors and walls in the room where such system is used.

A still further object of the present invention is to provide a new and improved support assembly which employs a unique upright standard having a plurality of opposing grooves and a pair of facing pocket portions disposed within a central channel defined in the standard, a threaded bolt, and an intermediate member slideable within and between said pocket portions to a preselected position and thereafter coactable with said channel and said bolt to readily secure said intermediate member to said standard where it may then be connected to a shelf bracket or partition to secure said bracket or partition relative to said standard.

Another object of the present invention is to provide a new and improved support assembly comprising a specially designed upright standard having locking means comprising a central channel having a plurality of axially extending grooves defined therein on opposed faces thereof, the grooves on each face being disposed in two groups contiguous with an intermediate pocket portion disposed in substantial registry with the corresponding pocket portion of the other face, said grooves coacting with a threaded bolt to provide locking means to secure a connector member disposed in and between said pocket portions to the standard.

These and still other objects as shall hereinafter appear are readily fulfilled by the present invention in a remarkably unexpected fashion as shall be readily discerned from a careful consideration of the following detailed description of exemplary embodiments of my invention, especially when read in conjunction with the accompanying drawing wherein like reference numerals identify similar parts throughout the several views and in which:

FIG. 1 is an isometric view of a book shelf embodying the support assembly of the present invention;

FIG. 2 is a frontal elevation of an assembly embodying the present invention;

FIG. 3 is a cross section taken on line III—III of FIG. 2 having a shelf bracket mounted in operative position;

FIG. 4 is a cross section taken on line IV—IV of FIG. 2;

FIG. 5 is an exploded view showing the relationship between an assembly embodying the present invention and a support bracket; and FIG. 6 is a front elevation of an alternative embodiment of the intermediate member of this invention.

Referring to FIG. 1 of the drawing, one embodiment of the novel support assembly of the present invention, identified by the general reference numeral 10, is shown in the highly useful setting to mount a plurality of book shelves 12 on brackets 14 which extend outwardly from standards 16.

As shown in FIGS 2-5, each assembly 10 is created by the coaction of standard 16, an intermediate member 18 and a bolt 20 as shall now be described.

In a preferred embodiment of my invention, standard 16 comprises a base portion 22 having a first flange member 24 and a second flange member 26 extending outwardly therefrom in a plane generally normal thereto. Each flange member 24, 26 is provided with an inner face portion 28 and an outer face portion 30 having an intermediate or pocket portion 32 interposed therebetween. Each face portion 28, 30 of flanges 24, 26 is provided with a plurality of longitudinally extending substantially parallel grooves 34, the purpose of which shall appear.

The generally U-shaped recess defined intermediate flange members 24, 26 shall for purposes of this description be called central channel 36.

Pocket portions 32 are disposed in substantial registry with each other and coact with each other to define means for receiving, guiding and holding intermediate member 18.

Intermediate member 18 is a relatively thin flat strip having a length substantially less than standard 16 and a width such that when member 18 is inserted into standard 16, a portion at each edge thereof enters the adjacent pocket portion 32.

Each member 18 is provided with a circular opening 38 and a plurality of bracket receiving openings 40 adapted to receive any of the currently available shelf brackets. Suitable openings 40 may be defined as slots (see FIG. 2) or as key holes (see FIG. 6) or as any other shape which is suitable to receive and hold such brackets as may be available from time to time.

The locking relationship in my assembly can be obtained by utilizing the system which I have designed in and for my standard. Referring to FIGS. 2-5, the threaded portion 42 of bolt 20 passes through opening 38 of member 18 and lockingly engages the grooves 34 defined in the central channel 36 of standard 16 to secure intermediate member 18 to the standard at a preselected location. Intermediate member 18, thus located, is secured in place by tightening bolt 20.

A description of an exemplary installation using bookshelves as a representative structure with which to employ my invention will now be presented to assist in the understanding of its function and to enhance the appreciation of its many advantages and conveniences.

To assemble the representative structure, such as the bookshelves shown in FIG. 1, a plurality of standards 16 manufactured in accordance with my description are bolted to the selected supporting surface such as the wall illustrated at 11.

With the present invention, it is no longer essential for utility to exactly align each of the standards 16 to assure that each (1) is exactly parallel with every other and (2) that each of the slots disposed therein are in horizontal alignment with the corresponding slots of each other standard. Instead, the standards of this invention are just mounted, quickly and easily, in any suitable fashion as with wood screws, molly fasteners, nails and the like.

Next an intermediate member 18 is inserted axially into pocket portions 32, one in each standard 16 for each shelf 12 to be installed, and moved to the desired location relative to the length of standard 16 whereupon the member 18 is fixed in that position by the tightening of bolt 20, which extends through opening 38 into channel 36, until threaded portion 42 firmly and lockingly engages grooves 34 disposed on inner face portions 28 of flange members 24, 26.

This operation is repeated in the second standard and such additional standards as the length of shelf 12 may dictate, slight care being exercised simply to align each of the intermediate members 18 so that when shelf 12 is placed upon the bracket 14 inserted into bracket receiving openings 40, shelf 12 will be level.

The connection of the bracket 14 to the intermediate member 18 is effected in the well known manner as by hooking the prongs shown in FIG. 5 into slots disposed in member 18 or by inserting shanks having enlarged heads (not shown) into the key holes as shown in FIG. 6 or by any other well known arrangement for connecting such brackets to conventional support standards.

When each bracket 14 is attached to its corresponding intermediate member 18 as by the insertion of the respective bracket prong 15 into its corresponding slot 40, shelf member 12 may be placed upon the cooperating brackets 14 to create the desired structure.

The same procedure is followed with respect to each of any other shelves 12 employed in the structure. Only in the installation and location of intermediate members 18 is any degree of care required to level the shelf and then only to the extent that each member 18 should be horizontally aligned with the corresponding member on the adjacent standard. It should be noted, however, the alignment obtained can occur on any segment of the entire height of the upright standard and is achieved simply by the adjustment of a single bolt.

The foregoing procedure is followed as many times as may be needed to provide the desired number of shelves of whatever length is wanted.

From the foregoing it becomes apparent that the bracket, intermediate member, and bolt cooperate to define an assembly which can readily be employed to easily and quickly install any type of commercially available shelves and brackets with a substantial reduction in the time and effort required to complete the job.

It is, of course, understood that while the invention is illustrated with respect to wall mounted standards, it is likewise readily employed with free standing standards, suspended standards or any other standard which can be maintained in a relatively stationary position.

The assemblage is also well adapted for use with free standing standards or uprights which are set in a weighted base member (not shown) to create modular displays and room partitions. The improved assembly herein described and illustrated can also be used with a multi-directional standard, e.g., two, three or four directional, using the linkage described in my previous U. S. Pat. No. 3,555,715 which issued Jan. 19, 1971.

From the foregoing, it becomes apparent that a new and improved support assembly has been herein described and illustrated which fulfills all of the aforestated objectives in a remarkably unexpected fashion. It is, of course, understood that such alterations, modifications and adaptations as may readily occur to the artisan when confronted with this disclosure are intended to be embraced within the spirit of the present invention which is limited only by the scope of the claims appended hereto.

What is claimed is:

1. A support assembly comprising in combination a support standard having a channel defined therein having opposing faces on the sides thereof, each of said faces having longitudinally extending grooves defined thereupon and a pocket portion disposed therewithin; an intermediate member insertable within said pocket portions and slideable therewithin to a preselected position relative to said standard, said member having an opening and a plurality of spaced bracket receiving means defined therethrough extending axially of said channel and a bolt extending through said opening into said channel for locking engagement with said grooves whereupon said standard, said intermediate member and said bolt are integrally joined to receive and support a bracket attachable to said intermediate member.

2. A support assembly according to claim 1 in which said bolt has a threaded shank for locking engagement within said grooves in said channel.

3. A support assembly according to claim 1 in which said intermediate member comprises a plate having an upper portion and a lower portion, said upper portion having said opening defined therethrough, said lower portion having said bracket receiving means defined therein comprising a plurality of spaced axially aligned slots extending therethrough.

4. A support assembly according to claim 1 in which said intermediate member comprises a plate having an upper portion and a lower portion, said upper portion having said opening defined therethrough, said lower portion having said bracket receiving means defined therein comprising a plurality of spaced axially aligned key holes extending therethrough.

5. A support assembly according to claim 1 in which said intermediate member comprises a thin elongated strip having means defined therethrough for securing said strip to said standard and additional means defined therein for connecting a bracket thereto.

* * * * *